INVENTOR
FREDERIC O. HESS
RICHARD E. B. WAKEFIELD
BY
ATTORNEY

Dec. 5, 1944.  F. O. HESS ET AL  2,364,214
AIRPLANE HEATING SYSTEM CONTROL
Filed Sept. 5, 1941  3 Sheets-Sheet 2
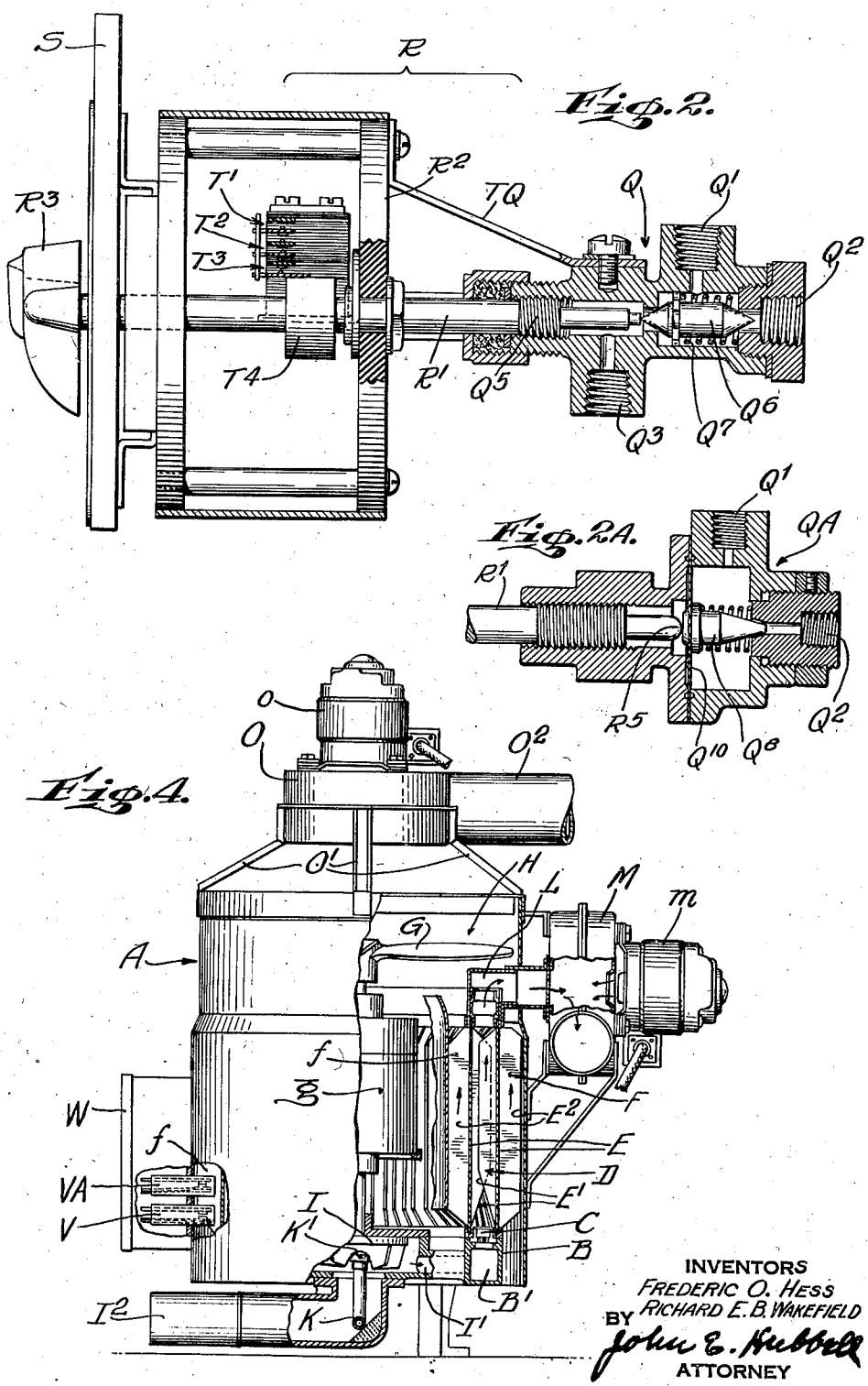
INVENTORS
FREDERIC O. HESS
RICHARD E. B. WAKEFIELD
BY John E. Hubbell
ATTORNEY Dec. 5, 1944.       F. O. HESS ET AL       2,364,214
AIRPLANE HEATING SYSTEM CONTROL
Filed Sept. 5, 1941       3 Sheets-Sheet 3
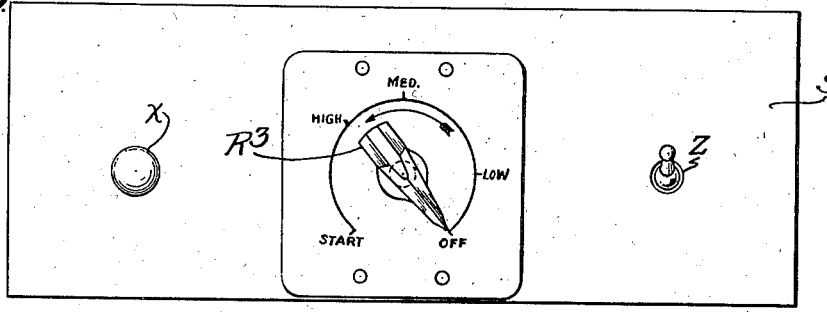
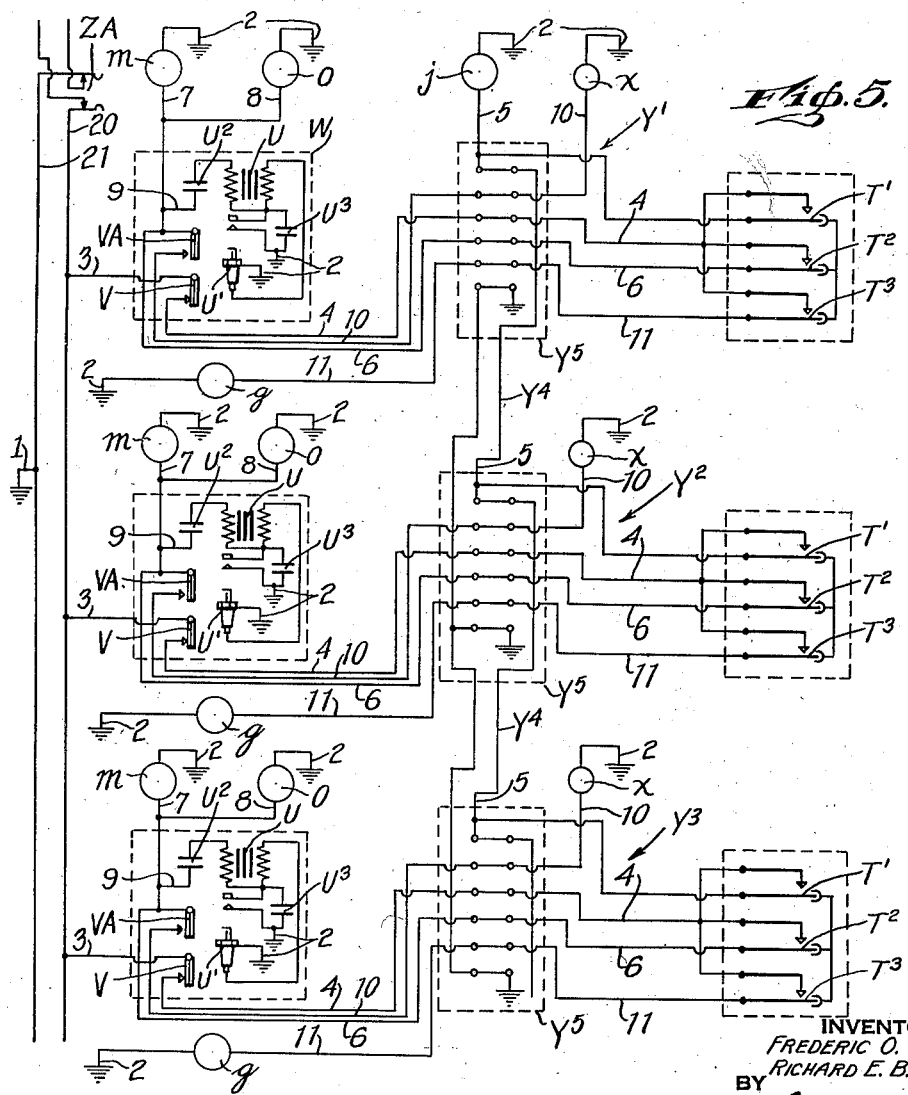
INVENTORS
FREDERIC O. HESS
RICHARD E. B. WAKEFIELD
BY
John E. Hubbell
ATTORNEY Patented Dec. 5, 1944

2,364,214

UNITED STATES PATENT OFFICE 2,364,214

AIRPLANE HEATING SYSTEM CONTROL

Frederic O. Hess, Germantown, and Richard E. B. Wakefield, Aldan, Pa., assignors to Selas Corporation of America, a corporation of Pennsylvania Application September 5, 1941, Serial No. 409,612

10 Claims. (Cl. 237—2)

The general object of the present invention is to provide simple and effective control provisions for airplane heating apparatus and systems of a type disclosed in the application, Serial No. 348,324, filed July 29, 1940, by Frederic O. Hess, one of the applicants herein. In a heating system of such type, which is now coming into use, hot air is the heating medium circulated in airplane cabins or other spaces to be heated, and supplied to windshield defrosters and other devices or airplane portions in which a relatively intense localized heating effect is desired. In such an airplane heating system, the air is heated in an air heater comprising a heating chamber for heated products of combustion and which is separated from the air being heated by thin metallic walls of unusually high heat transfer capacity.

An airplane heating system of the above-mentioned type may include a single heater, or a plurality of heaters, and each heater customarily includes an air circulating fan, a fan supplying a combustible mixture of air and atomized gasoline to a combustion zone at the inlet end of the heating chamber of the heater, and an exhauster fan for withdrawing products of combustion from the heating chamber. In addition, there may be associated with each heater another fan for increasing the pressure of heated air discharged by the heater, and passing it through a conduit system to a defroster or the like. Each of the heater fans may be driven by an individual electric motor, although in some cases a single motor may drive the main circulating fan and the fan supplying combustible mixture to the combustion zone of the heater. In addition, the heating system customarily includes at least one gasoline pump driven by a separate electric motor and supplying gasoline under suitable pressure to the atomizing provisions of the heater or heaters in the heating system.

To put such an air heater into or out of operation thus requires that a plurality of electric motors be started and stopped, and the necessary regulation of the heating effects produced requires a regulation of the rate of combustion in the combustion zone of the heater. Furthermore, it is practically desirable that a heating system including a plurality of heaters be adapted for use with different numbers of heaters under operation at different times. It is practically desirable, also, in many cases, that it be possible to operate the main heater fans for airplane ventilation purposes at times when no heating effect is desired.

More specifically stated, the general object of the present invention is to provide a simple and effective control system for an airplane heating system in which proper account is taken of special problems resulting from the vital necessity of economizing in the weight and bulk of the heating system including its control provisions, and from the fact that the control mechanism must require but little attention and manipulation from the airplane pilot. At the present time the major field of use for heating systems of the type mentioned is in war planes, and in a war plane the pilot may be called upon to give some attention to and manipulate as many as forty different control devices, all within a period of a few minutes, and the consequence of a maladjustment of any of those devices may be literally fatal to the pilot.

In accordance with our present invention each airplane heater may be put into and out of operation, and have its heating effect regulated by the oscillation of a single controller shaft through an angular range of less than 360°.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 2 is an elevation, partly in section, of a manually actuated controller including a control valve and control switches; Fig. 2A is a section through a control valve of modified form;

Fig. 3 is a control panel associated with the controller of Fig. 2 and adapted for mounting on an airplane control board;

Fig. 4 is an elevation, partly broken away and in section, of a portion of the heater shown diagrammatically in Fig. 1; and Fig. 5 is a wiring diagram showing the control circuits for three heaters installed in a single airplane and supplied with fuel by a common fuel pump, but otherwise independent in operation.

Figure 1:
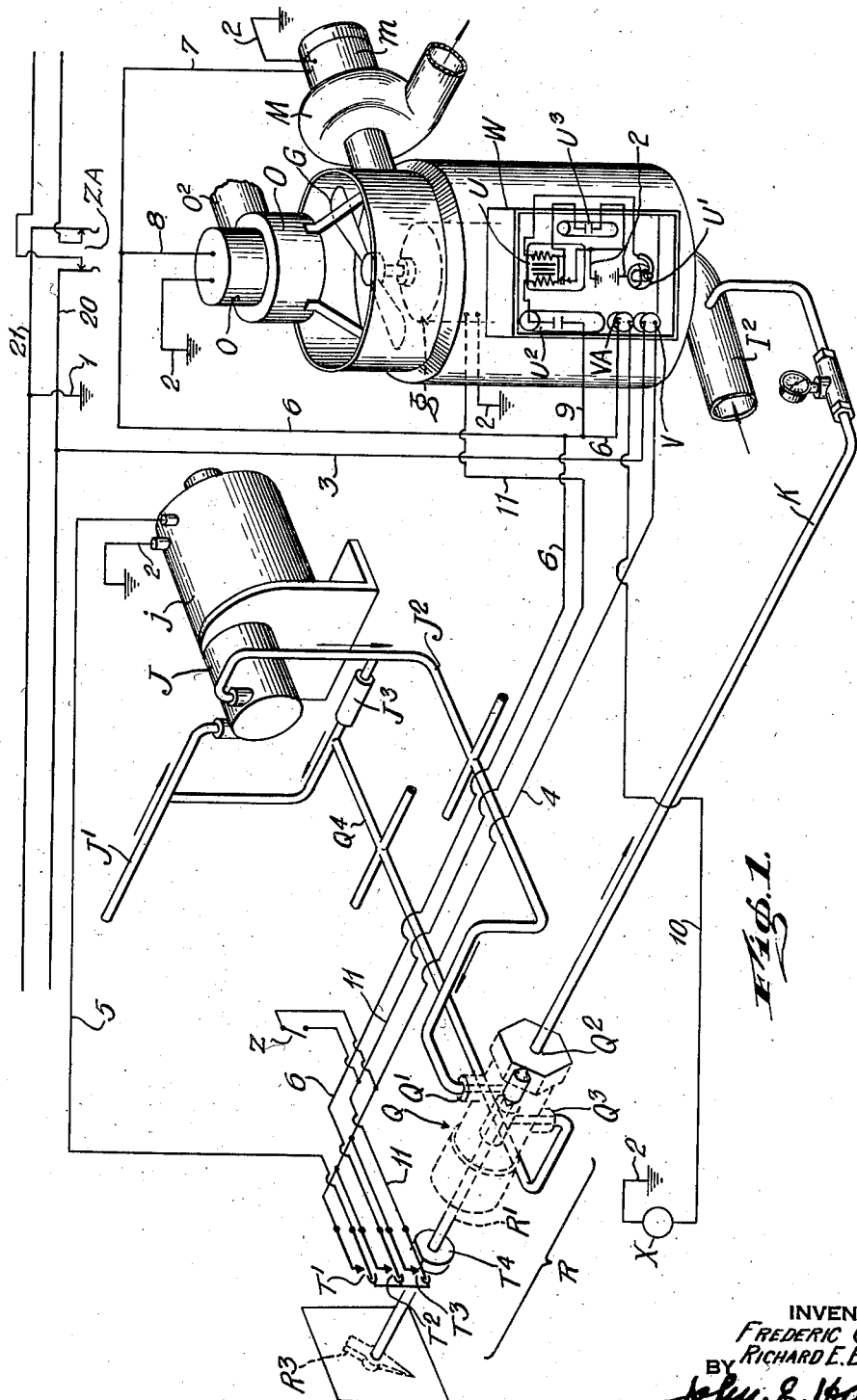
Fig. 1 is a diagrammatic representation of an airplane heater and controlling provisions associated therewith.

The airplane heater A shown for purposes of illustration in Figs. 1 and 4, is of the general type disclosed in the above-mentioned application, Serial No. 348,324, and is of a particular improved form disclosed and claimed in our concurrently filed application, Serial No. 409,613, filed September 5, 1941. The heater A comprises a burner body member B, which may be an aluminum casting, and which is formed with a burner inlet chamber B' in the form of an annular slot. An orifice wall C of ceramic material extends across the open side of the inlet chamber B' and is seated on the body B. The orifice wall C is advantageously formed of ceramic material in the form of radial laminae with grooves in their sides which serve as the burner orifices. A combustible mixture of air and atomized gasoline supplied to the chamber B', passes therefrom through the orifices in the wall C into, and burns in the bottom part of the chamber D in a region or zone adjacent to the wall C.

The chamber D is annular in cross section and has side walls E formed of thin metallic parts comprising fin or rib portions E' extending into the heating chamber D, and comprising other fin or rib parts $E^2$ which are external to the heating chamber and extend away from the latter into the air heating spaces F and $f$.

The air heated by the heater is moved through the spaces F and $f$ by a fan or rotary blower G mounted in an outlet chamber portion H of the heater A. The impeller of the fan G is driven by an electric motor $g$ located in the space surrounded by the heating chamber D. The combustible mixture of air and atomized gasoline is supplied to the burner inlet chamber B' by a fan I. The latter is of the turbo blower type and is located below and has its impeller driven by the motor $g$. The outlet I' of the fan I opens to the inlet chamber B', and the fan I draws air from the external atmosphere through an inlet pipe $I^2$. As shown in Fig. 1, gasoline fuel for the heater is supplied under suitable pressure by a pump J driven by an electric motor $j$ through the hereinafter described control valve Q to a pipe K. As shown in Fig. 4, the pipe K is provided with discharge orifice K' shaped and disposed to discharge a relatively small, high velocity jet of gasoline into the path of movement of the impeller blades of the fan I. The gasoline thus impinging against the rapidly moving impeller blades of the fan I is atomized, and the fan I thus forms a means for supplying a combustible mixture of combustion air and atomized gasoline to the bottom part of the chamber B.

As shown, products of combustion formed in the heating chamber D at the region adjacent to the wall C are drawn out of the chamber D at an outlet L by an exhaust fan M which is driven by an electric motor $m$ and discharges the products of combustion into the external atmosphere through which the airplane is moving.

As shown, the outlet chamber H of the heater opens directly into the space in which the heater is located, and through which air is thus recirculated by the fan G. As shown, however, some of the heated air passing out of the chamber H is sucked into the inlet opening in the underside of the casing of a distributing fan O, which is supported by arms O' from the shell or casing of the heater A. The fan O is driven by an electric motor $o$ and discharges air under pressure above that at which it is received through an outlet pipe $O^2$ which is adapted to pass the heated air to some device, such as a windshield defroster, to which heated air is desirably supplied at a pressure somewhat higher than the atmospheric pressure within the cabin or other space in which the heater is located.

The gasoline drawn into the fuel pump through its inlet pipe J' passes from the pump through the outlet pipe $J^2$ to the control valve Q, which forms part of a controller collectively designated R. The latter comprises a rotatable shaft R' mounted in the controller frame $R^2$, as shown in Fig. 2. The frame $R^2$ is connected to a control panel S and with the latter is mounted on the control board in the pilot's cabin of the airplane. The shaft R' extends through the panel S and in front of the latter carries an operating handle $R^3$ by which the pilot may rotate the shaft R'. As shown in Fig. 2, the valve Q is provided with a lateral inlet Q' to which the discharge end of the pipe $J^2$ is connected and with an axial outlet $Q^2$ through which gasoline passes to the pipe K. The valve Q is also provided with a lateral bypass outlet $Q^3$ through which gasoline may be returned by a bypass pipe $Q^4$ to the inlet of the pump J.

The valve Q is also formed with a threaded axial socket $Q^5$ receiving a threaded portion of the shaft R' whereby the rotation of the latter gives axial movement, in the direction to close the port $Q^2$, to a valve member $Q^6$ against the tendency of a spring $Q^7$ to give the valve axial movement in the opposite direction and thereby close communication between the inlet Q' and bypass outlet $Q^3$ while opening communication between the inlet Q' and the outlet $Q^2$. When the controller handle $R^3$ is in its "Off" position it holds the valve member $Q^6$ against the action of the bias spring $Q^7$ in the position in which it closes communication between ports $Q^2$ and Q', and permits communication between the ports Q' and $Q^3$. The valve member $Q^6$ is given its full range of axial adjustment by an angular adjustment of the shaft R' slightly less than 360°, on the movement of the handle $R^3$ from a position in which it registers with the "Off" mark on the panel S to the position marked "Start" in Fig. 3.

The shaft R' forms a switch actuator for closing three pairs of contacts T', $T^2$ and $T^3$. As shown, each of said contacts is carried by a spring finger, and when permitted to do so their supporting spring fingers hold the two contacts of each pair apart. As shown, the six spring fingers are arranged in superposed relation and each is rigidly connected at one end to the corresponding ends of the others to form a switch unit of the kind commonly employed in modern telephone receivers. Three spring fingers, one associated with each pair of spring contacts, are link-connected at their free ends, and are simultaneously deflected to bring the two contacts of each of the three pairs together by a single cam $T^4$ of insulating material mounted on the shaft R'. The cam $T^4$ may be arranged to simultaneously close the contacts T', $T^2$ and $T^3$ at predetermined time intervals or simultaneously, and as shown, is arranged to hold the contacts of each pair in engagement whenever the shaft R' is out of its "Off" position. It is generally desirable, however, that in starting the heater into operation the valve Q should be given an opening adjustment before any of the contacts T', $T^2$ and $T^3$ are closed.

As hereinafter explained, the opening and closing of the various contacts T', $T^2$ and $T^3$ normally control the energization of the motors $j$, $m$, $o$ and $g$ and also control the operation of a sparking coil U for energizing an electric igniter or spark plug U' which extends through the outer casing of the heater A and across the air space F into the bottom part of the chamber D. The control of the various electric motors and of the sparking coil is dependent, however, on the temperature of the thermostatic switches V and VA which have portions extending into the heater air space F, as shown in Fig. 4. As shown in Fig. 1, the sparking coil U and thermostatic devices V and VA are mounted in control box W secured to the outer side of the casing of the heater A, with the thermostatic elements V and VA projecting through openings in the back wall of the box and in the heater casing into the space F. The control box W also has mounted in it condensers $U^2$ and $U^3$ connected in circuit with the sparking coil U to give the latter a frequency of the order of 900 oscillations per second, which is much higher than the customary frequency of sparking coils and is desirable because it reduces radio interference, and reduces the disturbing effects on the operation of the sparking coil, which result from the great reduction in the pressure of the enveloping atmosphere occurring when the airplane is at high altitudes.

In the diagram shown in Fig. 5, Y', $Y^2$ and $Y^3$ are similar control sections, each adapted to separately control a corresponding one of three heaters mounted in different portions of the same airplane and each of the general type and form of the heater A shown in Figs. 1 and 4. The three control sections are entirely independent except for a connection formed by conductors $Y^4$ extending between the junction boxes $Y^5$ of the different sections, and through which the motor $j$, which drives the gasoline pump J supplying fuel to all three heaters, is started into operation whenever any one of the control sections Y', $Y^2$, and $Y^3$ has its controlling contacts adjusted to start the corresponding heater into operation. Each of the control sections Y', $Y^2$ and $Y^3$ includes conductors and associated control parts, which are identical in substance with similarly designated parts shown in Fig. 1. A description of the control mechanism of Fig. 1 thus includes a description of the individual control sections.

In Fig. 1, as in Fig. 5, 20 and 21 represent electric supply conductors ordinarily connected to the main source of electric current on the airplane in which the controlled heating provisions are mounted. As indicated, the current supplied by the conductors 20 and 21 is direct current and as shown, the supply conductor 21 is grounded by a ground connection 1. Each of the various circuits energized by the conductors 20 and 21 hereinafter described is customarily directly connected to the supply conductor 20 and is indirectly connected to the supply conductor 21 through a corresponding ground connection 2.

As shown in Fig. 1 and in Fig. 5, a conductor 3 connects the supply conductor 20 to one terminal of the thermostatic switch V which is normally closed, and opens and thereby renders the heater inoperative only when the heater temperature becomes excessive. The second terminal of the thermostatic device V is connected by a conductor 4 to one contact of each of the pairs of control contacts T', $T^2$ and $T^3$. The second contact T' is connected by a conductor 5 to one terminal of the pump motor $j$ and the second terminal of that motor is connected to a ground connection 2.

As shown in Fig. 5, the conductors $Y^4$ connect the different conductors 5 of the different control sections Y', $Y^2$ and $Y^3$. In consequence the closure of any one of the three pairs of contacts T' shown in Fig. 5 will energize the gasoline pump motor $j$.

The closure of the contacts $T^2$ of Fig. 1 connects those contacts to the supply conductor 20 through the conductors 3 and 4. The second contact $T^2$ is connected to a conductor 6 which has one branch 7 connected to a terminal of the motor $m$ and has a second branch 8 connected to a terminal of the motor $o$, the second terminal of each motor being connected to ground. The conductor 6 also has a branch 9 connected to one energizing terminal of the sparking coil U while the second terminal of the latter is grounded. The conductor 6 is also connected to one terminal of the normally open thermostatic switch VA, which closes when the heater is in operation and thereby connects the conductor 6 to a conductor 10 leading to one terminal of a signal light X mounted on the panel S and illuminated when the corresponding heater is at a normal operating temperature. If the operation of the heater is interrupted as a result of a stoppage or the accidental interruption of the supply of gasoline to its corresponding pipe K or through a failure of its spark plug U', the device VA will quickly cool down and the signal light will go out.

When the contacts $T^3$ of Fig. 1 are closed they connect the energizing conductor 20 through the conductors 3 and 4 to a conductor 11, and thereby to one terminal of the motor $g$ which drives the recirculating fan G. The second terminal of motor $g$ is grounded.

To permit operation of the recirculating fan motor $g$ for ventilating purposes without bringing the heaters into operation, a manually operable switch Z is shown in Fig. 1, as mounted on the corresponding control panel S. When that switch is closed it connects the conductor 11 to the conductor 4 and thereby to the supply conductor 20.

For ground operation of the heating system or of the ventilation fan, the conductors 20 and 21 may be temporarily connected to any suitable source of electric current which may be available, as by means of the diagrammatically illustrated plug connection switch ZA shown in Fig. 1 and in Fig. 5.

Advantageously and in accordance with the invention disclosed and claimed in the concurrently filed application, Serial No. 409,439, filed September 4, 1941, of Frederic O. Hess, one of the applicants herein, the various electric motors $g$, $m$ and $o$ are series motors and the fans driven by these motors are of such type that their volumetric discharge is approximately proportional to their rotative speeds. By the conjoint use of such a fan and such a driving motor, the weight rate at which a fan moves air or products of combustion through or away from the heater may be substantially independent of variations in the atmosphere enveloping the airplane and which normally increases and decreases as the airplane altitude advantageously decreases and increases.

In the construction shown, the full range of angular adjustment of the controller element R is the angle shown as a little more than 270°, between an off position and a starting position, indicated in Fig. 3 by the words "Off" and "Start," respectively. As the handle $R^3$ is moved counter-clockwise from its off position in which the index end at one end of the handle registers with the dial mark "Off," into the starting position in which the handle index registers with the dial mark "Start," the handle passes through intermediate low, medium and high positions indicated in Fig. 3 by the dial legends "Low," "Med." and "High," respectively.

While it is possible, of course, to time the switch action differently, with the desirable arrangement illustrated, the switch contacts T', T² and T³ are simultaneously closed and opened by movements of the handle R³ away from and toward the "Off" position of Fig. 3, while the handle is in proximity to that position and between it and the "Low" position. As shown, the valve member Q⁶ begins to open communication between the ports Q' and Q² as the handle R³ is moved in the counter-clockwise direction away from its off position, and the extend of the opening adjustment of the valve member Q⁶ relative to the outlet port Q² leading to the heater, progressively increases with the extent of angular displacement of the handle R³ from its off position, until the handle reaches the starting position. Conversely, the throttling effect of the valve member Q⁶ on the supply of gasoline to the heater through the port Q², progressively increases as the handle R³ is progressively turned in the clockwise direction from its starting position to its off position. In the preferred arrangement contemplated, the ratio of fuel to air supplied to the chamber D becomes that required for complete combustion, and the maximum heating effect when handle R³ has its index in register with the index marking "High" shown in Fig. 3.

Throughout the effective heat regulation range of adjustment of the handle R³, which is that in which the handle index moves between the dial markings "High" and "Low" of Fig. 3, the heating effect of the heater will be approximately proportional to the rate at which fuel is supplied to the chamber D which is dependent in turn upon the displacement of the valve member Q⁶ from the port Q², and hence upon the position of the handle R³ within its regulating range.

In the preferred arrangement, when the index of the handle R³ is between the dial markings "High" and "Start" of Fig. 3, more fuel is supplied to the combustion zone than can unite in complete combustion with the amount of air supplied to the chamber D. In consequence, the heating effect is not increased, but may be decreased somewhat, because of lowered combustion efficiency, by maintaining the valve member Q⁶ in a more open position than that corresponding to the dial marking "High." In starting the heater into operation, particularly when cold, there is a definite advantage, however, in having the air fuel mixture then supplied to the chamber D richer in fuel than is required for complete combustion, as such fuel richness of the mixture facilitates ignition.

In the preferred normal mode of operation contemplated, the heater is normally started into operation by turning the valve handle counter-clockwise from its "Off" position into its starting position shown in Fig. 3, and by thereafter moving the handle clockwise back from the starting position to or into the normal operating or regulating range between the dial markings "High" and "Low." Normally the fuel supplied to the heating chamber may be expected to ignite as the control handle is being moved into the starting position, and within a few seconds thereafter, the normally open thermostatic element VA should heat up sufficiently to close the energizing circuit for the indicator lamp x. The operator may well leave the handle R³ in the starting position until the lamp x lights, but if he turns the handle from the starting position back into the operative range before the lamp x lights and the lamp does not light up quickly thereafter, its failure to light up is an indication that the handle should be turned back to the starting position to keep the air fuel mixture supplied to the combustion mixture rich in fuel until ignition is effected and the heating chamber wall temperature rises.

The fact that the wall separating the heating chamber D from the adjacent air heating space formed by the channels F and f is made of thin sheet metal and comprises fins extending into the heating chamber and into the air heating spaces results in an unusually high rate of heat transfer between the heating chamber and the air heating space. In consequence, the heating wall temperature may well increase from atmospheric temperature to a normal working temperature within a fraction of a minute. Conversely, when the supply of fuel is turned off, or for some reason the burner flame is extinguished and is not promptly re-established by the spark plug igniter U', the heating chamber wall temperature may again cool down to atmospheric temperature within a fraction of a minute. On any temporary interruption in combustion which results in extinguishing the indicating lamp x, the operator can ordinarily restart combustion quickly by momentarily returning the controller handle R³ to its starting position and thereby correspondingly increasing the richness of the air fuel mixture supplied to the bottom part of the heating chamber.

The normally closed thermostatic element V serves to open the various motor energizing circuits on an increase in the temperature of the air space F approaching that at which the heater temperature is too high for safety. The resultant interruption in the supply of combustion air to the heater chamber D then permits the heater to quickly cool down to a normal temperature with the result that the thermostatic switch V again closes whereupon the heating system will normally resume operation without requiring any adjustment of the controller R. The safety action of the switch V is made especially important because the temperature of the heater may increase from its normal working temperature to a higher unsafe temperature in a very few seconds, when, for example, some temporary interference with the flow of air through the air heating spaces F and f occurs.

The simultaneous energization or deenergization of the various electric motors of the heating system or of a single section thereof when the system includes a plurality of heaters, as is contemplated in Fig. 5, has the practical advantage of saving electric energy and apparatus wear and tear, since, in general, with any one motor out of service, no useful result is obtained by having any of the other motors in operation. In special cases, however, it may be advantageous to operate for a period without using the fan O, but with the gasoline pump and other fans in operation. This result can be secured, of course, by temporarily opening a portion of the energizing circuit for the motor o which is individual to that motor.

In some cases, also, it is desirable to operate the circulating fan G for ventilation purposes without operating the heater to produce a heating effect, with the airplane on the ground or in the air. This result may be obtained by leaving the controller handle R³ in its off position and adjusting the switch Z shown in Fig. 1 and Fig. 3 to the position in which it connects the conductors 4 and 6 and thus energizes the motor g without requiring movement of the controller R out of its off position in which the contacts T', T² and T³ are open and the valve is closed. To avoid unnecessary drawing complication, Fig. 5 includes no showing of a switch Z. As will be readily apparent, however, each of the control system circuit sections Y', Y² and Y³ of Fig. 5 may include a corresponding switch Z through which the corresponding conductors 4 and 6 may be connected while the various contacts T', T² and T³ remain open.

With the described arrangement, the controller R merely starts and stops, and is not intended to regulate the speeds of the various electric motors energized when the contacts T', T² and T³ are closed, whereas any angular adjustment of the controller handle R³ produces a corresponding throttling adjustment of the valve member Q⁶, and the controller thus regulates the heating effect of the heater by regulating the amount of fuel supplied to the combustion chamber D.

Ordinarily it is advantageous to so design the heating system that under usual operating conditions a heating effect adapted to satisfy the normal or average heat demand will be obtained with the controller intermediate the ends of its operative range and in proximity to the position indicated in Fig. 3 by the dial mark "Med." Such a design permits the heat output of the heater to be increased or decreased when the demand for heat exceeds or is less than the usual demand, by a simple adjustment of the controller handle R³ in one direction or the other.

The density of the gasoline fuel is substantially unaffected by changes in airplane altitude and the speed of the pump J need not change as the airplane altitude varies. It is thus immaterial in general whether an electric motor driving the pump J is series or shunt wound. In practice it is ordinarily desirable to employ a gasoline pump of such capacity and so operated that it will deliver gasoline through its outlet pipe J² at a rate at least as great as that required to supply gasoline at the maximum rate to the heater or heaters served by the pump. Gasoline passed by the pump to the inlet Q' of a control valve and not passing through the port Q² of the valve to the corresponding heater, is returned to the pump through the valve bypass outlet Q³ and return pipe Q⁴. When a single gasoline pump supplies gasoline to a plurality of heaters, as contemplated in Fig. 5, the pump delivery pipe J² and return pipe Q⁴ are formed with branched connections to the corresponding ports of the control valves Q for the different heaters.

When the fuel pump has directly associated with it the usual relief valve connection J³ between the pump inlet J' and outlet J² to limit the maximum delivery pressure, the connection of the control valve in a second bypass is not essential. The elimination of the second bypass permits the use of a simpler control valve such, for example, as the valve QA shown in Fig. 2A. It also reduces the fuel pump capacity required especially when a single fuel pump is employed to supply fuel to a plurality of heaters, as is the case in the system shown diagrammatically in Fig. 5. The control valve QA shown in Fig. 2A omits the bypass outlet Q³ of the previously described valve Q and has a conical needle valve member Q⁸ adapted to seat against the conical inner end of the outlet port Q² to close the latter. The end of the valve member remote from the port Q² is welded or otherwise secured to the central portion of a flexible diaphragm Q¹⁰. The latter is secured at its periphery to the casing of the valve QA and forms the rear wall of the valve chamber through which the ports Q' and Q² are in communication. The outer side of the valve disc Q¹⁰ is shown as having a reinforcing pad welded thereto for engagement by the round inner end R⁵ of the valve spindle R'. The latter is in threaded engagement with the valve casing as in the construction shown in Fig. 2.

The use of the flexible diaphragm Q¹⁰ in lieu of the conventional stuffing box shown in Fig. 2, is not essential to the elimination of the bypass connection to the valve QA, but desirably simplifies the construction and reduces the inherent cost of the valve. As the total range of movement of the valve Q⁸ required in normal valve operation is of the order of .01 of an inch, the diaphragm Q¹⁰ can be made of very thin metal and still have a suitably long operative life. The smallness of the valve movement required is explained by the fact that the quantity of gasoline required in a heating system of the type disclosed is relatively small. For example, the maximum rate at which gasoline is supplied to a single heater may be about 3½ pounds per hour in the case of a heater of relatively small size, and about 8 pounds per hour in a relatively large heater.

Inasmuch as the atomization of the gasoline is due primarily to the mechanical action of the blades of the impeller of the fan I on the jet of gasoline discharged by the orifice K', and not to the velocity of the jet, or to the reduction in the gasoline pressure as it passes through the nozzle orifice K', the pressure at which the gasoline is supplied to the nozzle orifice may well vary from the low maximum of about one pound to five pounds per square inch, as the throttle valve is adjusted between its low and high positions. For such a range in gasoline pressure at the inlet end of the nozzle orifice K' the pump pressure relief or bypass valve J³ may be set to normally maintain a delivery pressure of about ten pounds, which is sufficient for proper regulation and to take care of pressure loss in the fine tubing through which gasoline may pass to the pump from the gasoline supply line and from the pump to the heater or heaters.

Considerable variation in the length of the tubing connecting the pump to the individual heaters will occur since the location of the heater, while determined in part by the location of the space or device to be heated, is also dependent to a considerable extent upon the availability of the space required to receive the heater. The fuel pump on the other hand is preferably located adjacent some airplane gasoline distribution pipe where there is sufficient space for the small high-speed, motor fuel pump unit.

While in accordance with the provisions of the statutes, we have illustrated and described the best forms of embodiment of our invention now known to us, it will be apparent to those skilled in the art that changes may be made in the form of the apparatus disclosed without departing from the spirit of our invention, as set forth in the appended claims and that in some cases certain features of my invention may be used to advantage without a corresponding use of other features.

Having now described our invention, what we claim as new and desire to secure by Letters Patent is:

1. The combination with an airplane, of a heating system therefor comprising a heater having a chamber, means for supplying a mixture of combustion air and atomized gasoline to said chamber including a fan having an inlet for atmospheric air and a rotary impeller, an electric driving motor rotating said impeller at a speed which increases and decreases as the air density at said inlet is decreased and increased by changes in airplane altitude, and means including a fuel valve for discharging gasoline into atomizing engagement with said impeller at a rate regulated by the adjustment of the valve, a control element operatively connected to said valve and manually adjustable between off and starting positions, in which the valve is respectively closed and wide open, through an intermediate throttling range, said valve being adapted to open to an extent which progressively increases as the adjustment displacement of said element from its off position increases and which becomes sufficient to supply all the gasoline required for the complete combustion of said mixture when the valve is at the end of its throttling range remote from said off position and which is sufficient, when the valve is in said starting position, to supply gasoline at a rate sufficient to form a rich starting mixture including more gasoline than is required for complete combustion, and means actuated by said element to stop and start operation of said element as said control element respectively approaches and moves away from said off position.

2. The combination specified in claim 1, in which said heater comprises structure providing an air heating space having a thin wall with a high heat transfer capacity separating such space and said chamber.

3. The combination specified in claim 1, comprising a motor driven pump supplying gasoline to said valve, and means through which said control element stops and starts operation of said pump as said element respectively approaches and moves away from said off position.

4. The combination specified in claim 1, comprising an air circulating fan having a separate electric driving motor and adapted to move air to be heated through said heater, and to circulate air for ventilation purposes, and means through which said control element starts and stops the last mentioned motor when it starts and stops the motor driving said impeller, and a separable control element operable to energize the said motor driving the ventilating fan when the motor driving said impeller is stopped.

5. In an airplane heating system, the combination with a heater having a chamber, a motor driven fan for passing combustion air into said chamber from the enveloping atmosphere and a motor driven fan for passing products of combustion from said chamber into the enveloping atmosphere and respectively adapted, when energized, to supply combustion air to and to pass products of combustion from said chamber at substantially constant weight rates notwithstanding variations in the pressure of the enveloping atmosphere, means including a throttling valve for passing fluid fuel into said chamber at a rate depending on the adjustment of the throttling valve, a control element manually movable to adjust said throttling valve between closed and open positions, and means actuated by said element as it moves said valve away from and back to its closed position to respectively energize and deenergize said motor driven fans.

6. In an airplane heating system, the combination of a plurality of heaters each having a chamber, means including a separate fan for supplying combustion air to the chamber of each heater, a separate driving motor for each fan, means for supplying fluid fuel to the chambers of different heaters comprising a common fuel pump, a motor driving said pump, and a separate throttling valve for each heater through which the chamber of the latter is connected to said pump, and a control system comprising a separate manually adjustable control element associated with each heater and adapted by its adjustment to adjust the corresponding throttling valve and to energize and deenergize the corresponding fan driving motor and means through which the movement of each of said control elements energizes the corresponding fan motor and energizes the pump driving motor if the latter is not already energized.

7. In an airplane heating system, the combination of a plurality of heaters each having a chamber, means including a separate fan for supplying combustion air to the chamber of each heater, a separate driving motor for each fan, means for supplying fluid fuel to the chambers of different heaters comprising a common fuel pump and a separate throttling valve for each heater to which the chamber of the latter is connected to said pump, a motor driving said pump and having a plurality of energizing circuits, and a control system comprising a separate manually adjustable control element associated with each heater and adapted by its adjustment to adjust the corresponding throttling valve to energize and deenergize the corresponding fan motor and to open or close one of said energizing circuits which is different from those opened and closed by the other control elements.

8. A heating system including a heating unit having a combustion space, means to supply a combustible mixture of air and fuel to the space including a blower and a fuel line, a pump for the fuel line, structure in the fuel line to control flow of fuel therethrough, an electrical igniter for igniting the combustible mixture supplied to the space, a fan for circulating air to be heated past the heating unit, means including a single manually operable control member arranged to operate the flow control structure, said control member being rotatable to a plurality of positions so that the flow of fuel in the fuel line may be varied by the flow control structure, electrical means for driving the pump and blower and fan, means for connecting the igniter and electrical means to a source of electrical energy, said connecting means including switch means associated with said rotatable control member whereby movement of the latter to one position opens the switch means and to another position closes the switch means, and thermal responsive means to open the connecting means in response to a predetermined abnormally high temperature of the heating unit and to automatically close the connecting means when the temperature of the heating unit falls below the predetermined abnormally high temperature and the switch means is closed by said control member.

9. In combination with an airplane, of a heating system for heating an enclosure in the airplane including a heating unit having a combustion space, means to supply a combustible mixture of air and fuel to the space including a blower and a fuel line, a pump for the fuel line, structure in the fuel line to control flow of fuel therethrough, an electrical igniter for igniting the combustibe mixture supplied to the space, means including a fan for circulating air to be heated past the heating unit into the enclosure, a control panel in the enclosure, means including a single manually operable control member arranged to operate the flow control structure, said control member being mounted on the panel and rotatable to a plurality of positions so that the flow of fuel in the fuel line may be varied by the flow control structure, electrical means for driving the pump and blower and fan, means for connecting the igniter and electrical means to a source of electrical energy, said connecting means including switch means associated with said rotatable control member whereby movement of the latter to one position opens the switch means and to another position closes the switch means, an electrical indicator mounted on the panel, means to connect said indicator to the source of electrical energy when combustion is being effected in the space, and thermal responsive means to open the connecting means in response to a predetermined abnormally high temperature of the heating unit and to automatically close the connecting means when the temperature of the heating unit falls below the predetermined abnormally high temperature and the switch means is closed by said control member.

10. A heating system including a heating unit having a combustion space; means to supply a combustible mixture of air and fuel to the space including a blower and fuel supply means; said fuel supply means including a fuel supply line, a pump for the fuel line, an electrical translating device for operating the pump, and valve means in the fuel line to vary flow of fuel therethrough; an electrical ignitor for igniting the combustible mixture supplied to the space; a fan for circulating air to be heated past the heating unit; means including a single manually operable control member arranged to operate said valve means, said control member being rotatable to a plurality of positions so that the flow of fuel in the fuel line may be varied by the valve means; electrical means for driving the blower and fan; means for connecting the ignitor, the electrical translating device and electrical means to a source of electrical energy, said connecting means including switch means associated with said valve operating means whereby movement of the rotatable member to one position opens the switch means and to another position closes the switch means; and thermal responsive means associated with said connecting means to shut off flow of fuel to the space by said fuel supply means in response to a predetermined abnormally high temperature of the heating unit and to automatically effect flow of fuel to the space by said fuel supply means when the temperature of the heating unit falls below the predetermined abnormally high temperature and the switch means is closed by said control member.

FREDERIC O. HESS.
RICHARD E. B. WAKEFIELD.